United States Patent Office 3,526,431
Patented Sept. 1, 1970

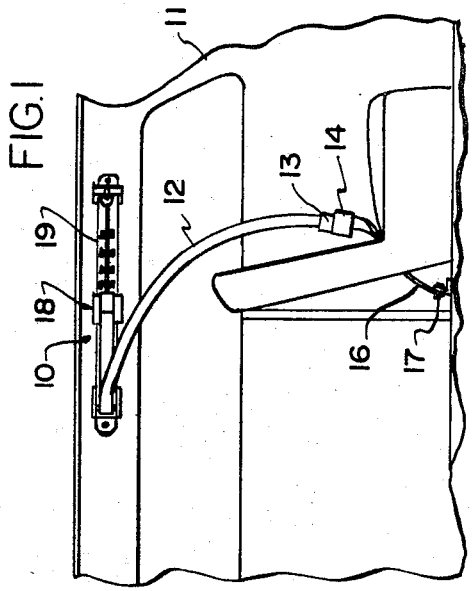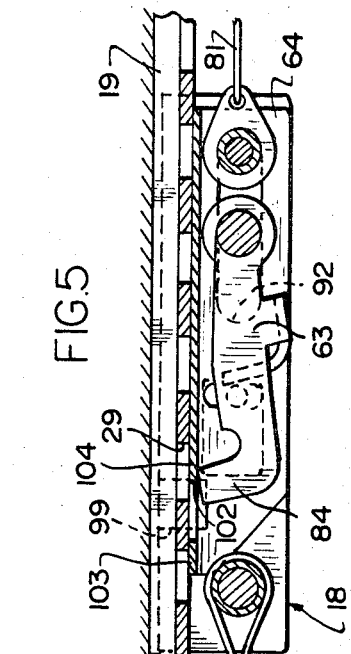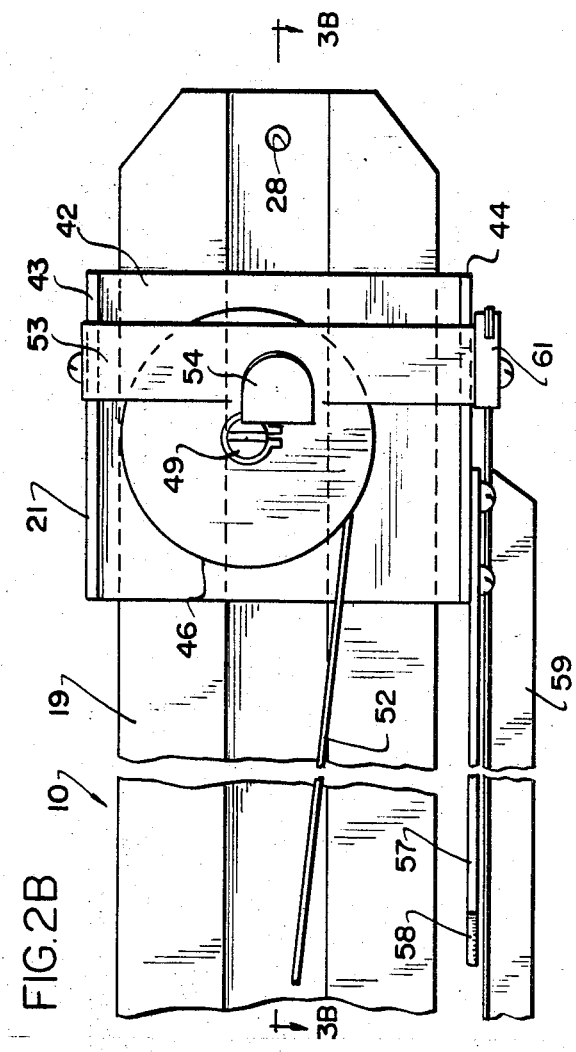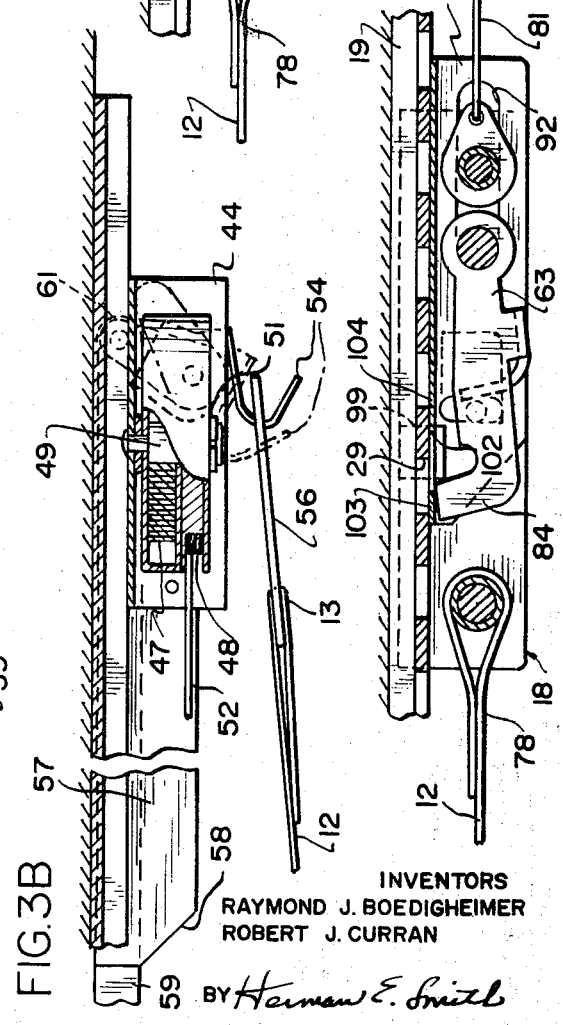
INVENTORS
RAYMOND J. BOEDIGHEIMER
ROBERT J. CURRAN
BY Herman E. Smith
ATTORNEY

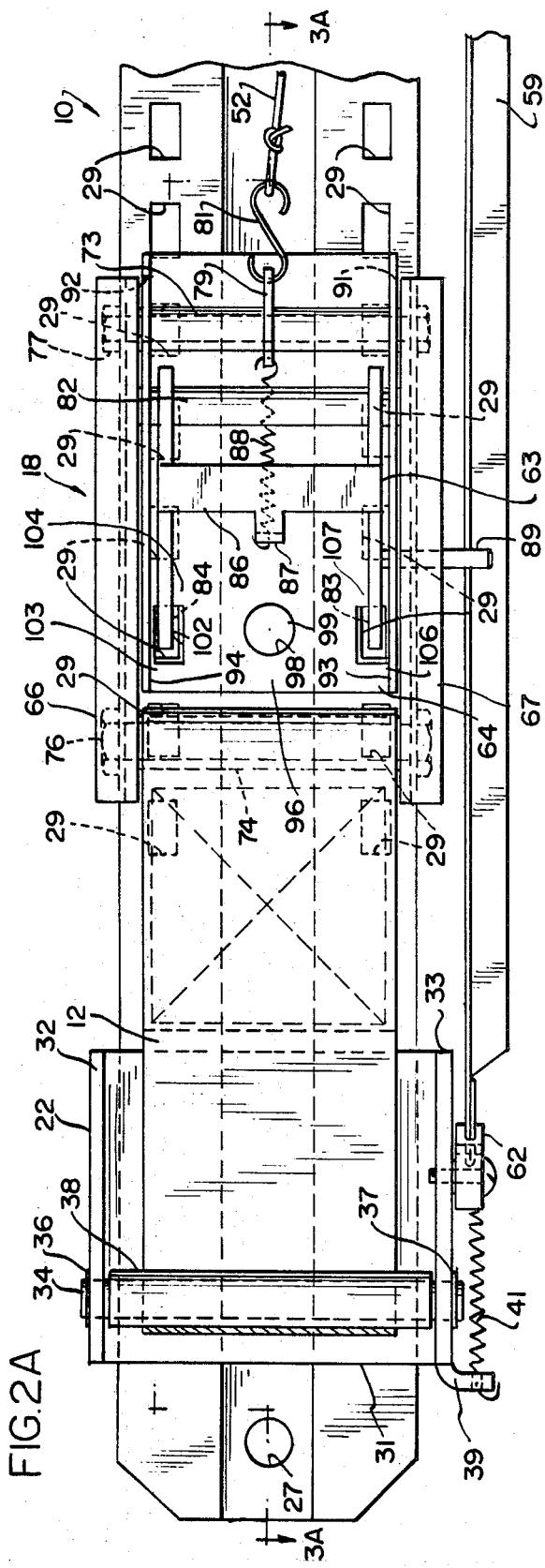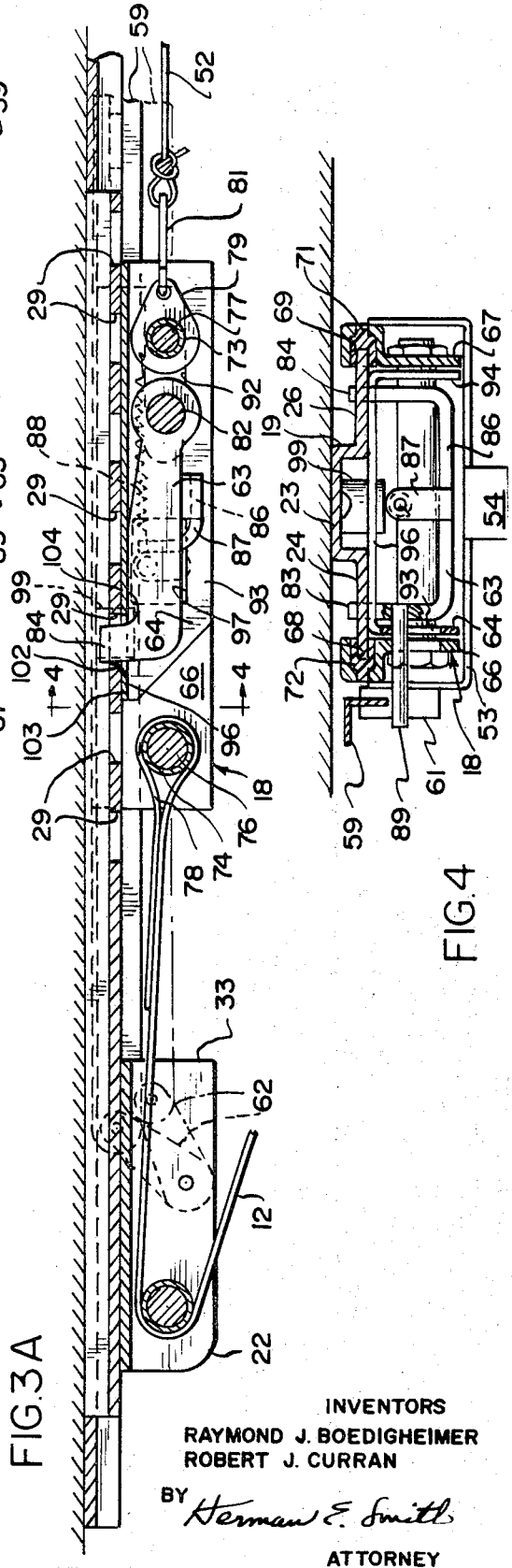

3,526,431
LINEAR RETRACTOR
Raymond J. Boedigheimer, Chicago, and Robert J. Curran, Elmhurst, Ill., assignors to Borg-Warner Corporation, Chicago, Ill., a corporation of Delaware
Filed Dec. 23, 1968, Ser. No. 786,143
Int. Cl. A66b 35/02; B65h 75/48
U.S. Cl. 297—388
9 Claims

ABSTRACT OF THE DISCLOSURE

A linear safety belt retractor has a thin elongated configuration suitable for overhead mounting in a vehicle between the upholstery and frame, and includes locking means operable in response to a reversal in the direction of belt movement for automatically locking the belt against both extension and retraction at intermediate positions within the range of extension.

SUMMARY OF THE INVENTION

The present invention relates generally to belt retractors and more particularly to a locking retractor arranged for locking a belt against movement in both extension and retraction directions.

Among the objects of the present invention are to provide a relatively thin elongated belt retractor adapted for overhead mounting in a vehicle; to provide apparatus permitting adjustment of the effective length of the belt; to provide apparatus for locking the belt against movement in both extension and retraction directions; and to provide apparatus operable automatically in response to a sequence of belt movement. Other objects and advantages of the invention will become apparent from consideration of the following description together with the drawings.

BRIEF DESCRIPTION OF THE DRAWINGS

FIG. 1 is a fragmentary elevation view of a vehicle showing the belt adjusting apparatus of the present invention in relation to other portions of the vehicle;

FIGS. 2A and 2B are plan views of opposite end portions of the belt adjusting apparatus according to the present invention;

FIGS. 3A and 3B are elevation views in section corresponding with FIGS. 2A and 2B;

FIG. 4 is a transverse section view taken along the line 4—4 of FIG. 3A; and

FIGS. 5 and 6 are elevation views of a belt carrier and locking means comparable with portions of FIG. 3A.

DESCRIPTION OF THE PREFERRED EMBODIMENT

Referring now to the drawings and particularly FIG. 1 thereof, the reference character 10 indicates belt adjusting apparatus according to the present invention mounted in a vehicle 11. Belt adjusting apparatus 10 is particularly adapted for overhead mounting in a vehicle such that a length of belt 12 may be pulled down across the shoulder of a vehicle occupant and adjusted to a suitable length to provide a shoulder harness type safety belt. When the belt has been adjusted to a suitable length, the manually accessible end portion 13, 56, is inserted into a clasp 14 which is anchored to the vehicle as by the short length of belt 16 and anchor 17, while the other end of belt 12 is anchored to the vehicle by means of the belt carrier 18 and guide member 19. Both ends of belt 12 are thus anchored to the vehicle, one being adjustable, such that a predetermined amount of slack may be selected and maintained without exerting pressure on the body of the vehicle occupant.

Belt adjusting apparatus 10 including guide member 19, belt carrier 18, retractor unit 21 and belt directing roller unit 22, is shown in more detail in FIGS. 2A through 4.

Guide member 19 includes a pair of rail-like portions 24, 26 extending laterally from opposite sides of a channel-form midsection 23. Midsection 23 is provided with a pair of mounting apertures 27, 28 through which may be inserted fastening devices such as cap screws or the like for mounting the apparatus in a vehicle. Each of the rail portions 24, 26 is provided with a plurality of apertures 29 arranged in series along the length of the guide. Each of the apertures 29 is of a configuration suitable for receiving a portion of a locking means to be described hereinafter.

The belt directing roller unit 22 includes a channel shaped frame 31 secured to guide member 19 having side wall portions 32, 33. A shaft 34 extends through side walls 32, 33 and is secured against axial movement by retainer rings 36, 37. A roller 38 extends between side walls 32, 33 and is journalled on shaft 34 serving as a guide for belt 12. Side wall 33 includes a laterally extending ear 39 which provides a mounting means for the release bar biasing spring 41.

Retractor unit 21 also includes a channel-form frame member 42 secured to guide member 19 having side wall portions 43, 44. A yieldable winding device 46 including a spring motor 47 and reel 48 is mounted on frame 42 by means of the mounting post 49 and retainer clip 51. Spring motor 47 is arranged to urge rotation of reel 48 in the counterclockwise direction as viewed in FIG. 2B exerting tension on the flexible cord 52. A release actuator 53 is pivotally mounted on side walls 43 and 44 and includes a belt storage hook portion 54 engageable with tongue member 56.

A stationary release arm 57 is mounted on side wall 44 adjacent guide member 19 and includes a camming surface 58 spaced from side wall 44. An elongated movable release bar 59 is pivotally connected to a lever 61 extending from release actuator 53, to a lever 62 pivotally mounted on side wall 33 of roller unit frame 31. The mounting of release bar 59 and levers 61, 62 provides a parallelogram type four-bar linkage which moves release bar 59 away from guide member 19 when the belt storage hook 54 and release actuator 53 are moved from the solid line position to the broken line position in FIG. 3B.

Referring now to FIGS. 2A, 3A, and 4, belt carrier 18, locking means 63 and latch member 64 are shown in more detail. Belt carrier 18 includes a pair of spaced side walls 66, 67 each including a groove 68, 69 provided with an anti-friction liner 71, 72. The liners 71, 72 embrace respective rail portions 24, 26 of guide member 19 facilitating sliding movement of carrier 18 along guide member 19. Translational movement of carrier 18 toward retractor unit 21 is referred to herein as movement in the retraction direction, while movement of carrier 18 toward roller unit 22 is referred to as movement in the extension direction. Carrier unit 18 is provided with a pair of spacer members 73, 74 extending between and secured against side walls 66, 67 by cap screws 76, 77. A loop portion 78 of belt 12 embraces spacer 74 providing a connection between belt 12 and carrier 18. The other spacer 73 includes a connector 79 to which the flexible cord 52 is connected by means of the hook 81. Carrier 18 may thus be pulled along guide 19 in the extension direction by means of belt 12 and in the retraction direction by means of the winding device 46 and cord 52.

Locking means 63 is pivotally connected to carrier 18 by means of the cross shaft 82 and includes nose portions 83, 84 receivable within the aperture 29. A cross member 86 supports a tang 87 which provides a connection for bias spring 88. Bias spring 88 is connected between locking means 63 and connector 79 of carrier 18 such that nose portions 83, 84 are biased toward a locked position in which the nose portions are received within the apertures of the guide member. An operating finger 89 extends from one side of locking means 63 beneath release bar 59. When release bar 59 is moved away from guide 19 by means of actuator 53, operating finger 89 is moved away from guide 19 such that locking means 63 is moved to a released position in which nose portions 83, 84 are disengaged from aperture 29.

Latch member 64 includes a transverse web 96 extending between a pair of side walls 93, 94. Side walls 93, 94 include elongated openings 91, 92 embracing spacer 73 and cross shaft 82 to form a slidable mounting permitting relative reciprocatory movement of latch member 64 with respect to carrier 18 and locking means 63. Side wall 93 also has a generally rectangular window 97 surrounding the operating finger 89 accommodating movement of locking means 63 toward and from the guide member 19 while at the same time accommodating sliding movement between the latch and locking means.

Transverse web 96 includes an aperture 98 through which extends a magnetized pin 99 engaging the channel-form midsection 23 of guide member 19. Magnetized pin 99 thus provides brake means slidably engaging guide member 19 for temporarily arresting movement of latch member 64 independently of the carrier 18. While magnetized pin 99 represents a preferred form of braking means, other forms of braking means may be employed if desired, for example, a spring loaded shoe.

The transverse web 96 also includes a pair of slots 101, 102 each arranged for alignment with a respective nose portion 83, 84 and with a respective row of apertures 29. Each of slots 101, 102 is defined in part by portions of web 96 herein denoted as mask portions 103, 104 and 106, 107. Comparison of FIGS. 3A with FIGS. 5 and 6 shows three significant relative positions of latch member 64 and mask portions 103, 104 with respect to locking means 63 and the associated nose portion 84. In FIG. 3A, mask portions 103, 104 are spaced from nose portion 84, permitting entry of nose portion 84 through slot 102 into one of the apertures 29. FIG. 5 illustrates retraction movement of carrier 18 during which mask portion 104 of latch member 64 is disposed between nose portion 84 and guide member 19 holding locking means 63 in a released position. FIG. 6 illustrates extension movement of carrier 18 during which mask portion 103 of latch member 64 is disposed between nose portion 84 and guide member 19 holding locking means 63 in a released position. While the illustration shows the nose portion 84 in relation to slot 102 and mask portions 103, 104 it is believed clear without further illustration that nose portion 83 bears a similar relationship to the slot 101 and mask portions 106, 107. In the present embodiment it is preferred to employ two parallel rows of apertures together with locking means and latch member adapted for cooperation therewith, however, it is to be understood that this construction is but one example of a suitable form of locking means and guide member.

OPERATION

Considering now the operation of the above described belt adjusting apparatus in terms of an operating sequence, first assume that belt carrier 18 is in a retracted position immediately adjacent retractor unit 21. In the retracted position operating finger 89 of locking means 63 is in contact with stationary release arm 57 retaining nose portions 83, 84 in a released position spaced from guide member 19. Brake member 99 frictionally grips guide member 19 such that latch member 64 tends to remain stationary with respect to guide member 19. If belt 12 is then pulled in the extraction direction, carrier 18 and locking means 63 are moved in the extraction direction to the limit permitted by openings 91, 92, while latch member 64 remains stationary such that nose portions 83, 84 overlap mask portions 103, 106. Further movement of belt 12 in the extraction direction results in movement of carrier 18, locking means 63, and latch member 64 away from the retracted position. So long as unidirectional movement is maintained in the extraction direction, locking means 63 is held in the released position by means of mask portions 103, 106. During extraction movement the relative positions of locking means and latch are as shown in FIG. 6.

When the desired amount of belt has been pulled out, tension is relaxed permitting winding device 46 to move carrier 18 toward the retracted position. During this reversal in the direction of movement of carrier 18, latch member 64 is gripped to guide member 19 by brake means 99 producing reciprocatory motion between latch 64 and locking means 63. It is believed evident from inspection of FIGS. 6 and 3A that such relative motion initially results in movement of nose portion 84 from mask portion 103 into slot 102 followed by further movement of nose portion 84 into the next available aperture 29. When the nose portion 84 is engaged with an aperture 29, carrier 18 is prevented from movement in either extension or retraction direction. Belt 12 is thus locked against further extension so as to provide safety restraint for a vehicle occupant, and is also locked against retraction thereby removing belt pressure from the body of the occupant allowing the belt to be worn comfortably loose. In the embodiment shown, the carrier may be locked to the guide at any of the intermediate positions represented by an aperture 29, thus permitting adjustment of the belt to the desired effective length.

In order to retract the belt, hook 54 is moved from the solid to broken line positions shown in FIG. 3B. This may be done by hand where it is desired to remove excess slack from a belt which has been coupled to belt clasp 14, or by engaging the tongue member 56 when it is desired to fully retract the belt to a storage position. Movement of hook 54 is effective to operate the parallelogram linkage consisting of levers 61, 62 and release bar 59 such that reelase bar 59 contacts operating finger 89 no matter where carrier 18 happens to be located along guide member 19. Release bar 59 moves operating finger 89 away from guide member 19 which moves nose portion 84 out of aperture 29 to a released position. If carrier 18 is allowed to move in the retraction direction, nose portion 84 is moved into a position overlapping mask portion 104 since latch member 64 is momentarily stationary with respect to guide 19 as a result of brake means 99. Locking means 63 is then retained in the released position as shown in FIG. 5. If it is desired to remove excess slack from the belt, the carrier is allowed to move the desired amount in the retraction direction after which the direction of movement of the carrier is reversed by a pull on the belt. This causes nose portion 84 to slide off mask portion 104 into slot 102 and into the next adjacent aperture 29. If full retraction is desired, the carrier is allowed to continue in the retraction direction until the retracted position is reached. In the retraction position, the camming surface 58 of release arm 57 cooperates with operating finger 89 to hold locking means 63 in the released position. This permits reversal of carrier movement preparatory to again extending the belt from the retracted position without attention to the release bar 59.

While a preferred embodiment of the invention has been shown and described in the accompanying drawings and above description, it is to be understood that alterations and modifications thereof remain within the spirit of the invention and the scope of the following claims.

What is claimed is:

1. Safety belt adjusting apparatus including an elongated guide member, a belt carrier mounted for translational movement along said guide member, releasable locking means operatively connected with said carrier for movement between a locked position effective to secure said carrier against movement along said guide member and a released position permitting movement of said carrier along said guide member, said locking means being biased toward said locked position, and a latch member operatively connected to said carrier for movement with respect to said locking means in response to movement of said carrier along said guide member, said latch member being urged toward restraining engagement with said locking means for holding said locking means in said released position in response to unidirectional movement of said carrier along said guide member, and being urged from said restraining engagement with said locking means permitting movement of said locking means toward said locking position in response to reversal in the direction of movement of said carrier along said guide member.

2. The invention according to claim 1, in which said locking means includes a nose portion biased for movement toward said guide member, said guide member defining a plurality of apertures serially disposed along the length thereof, each of said apertures adapted to receive said nose portion, said nose portion in cooperation with said apertures providing means for securing said belt carrier to said guide member at selected positions along the length of said guide member.

3. The invention according to claim 1, in which said latch member is slidably mounted on said carrier, providing limited reciprocatory movement between said latch member and said locking means.

4. The invention according to claim 1, in which said latch member is slidably mounted on said carrier and includes brake means slidably engaging said guide member, said brake means retarding movement of said latch member during reversal in the direction of movement of said carrier along said guide member, providing relative reciprocatory movement between said latch member and said locking means.

5. The invention according to claim 1, in which said locking means includes a nose portion biased for movement toward said guide member, said guide member including a series of apertures disposed along the length thereof, each of said apertures adapted to selectively receive said nose portion, said latch member including a slot adapted to receive said nose portion, said latch member being slidably mounted on said carrier and including brake means engaging said guide member, providing relative movement between said latch member and said locking means in response to reversal in the direction of movement of said carrier, permitting entry of said nose portion through said slot into one of said apertures for securing said carrier against further translational movement along said guide member.

6. The invention according to claim 5, in which said latch member includes a pair of spaced mask portions defining said slot, one of said mask portions being engageable with said nose portion for holding said locking means in said released position during unidirectional movement of said carrier in an extension direction, and the other of said mask portions being engageable with said nose portion for holding said locking means in said released position during unidirectional movement of said carrier in a retraction direction.

7. Safety belt adjusting apparatus according to claim 1, including a length of belt connected to said carrier having an end portion extending externally of said apparatus providing manually accessible operating means for pulling said carrier in an extraction direction, and a yieldable winding device connected to said carrier in opposition to said length of belt urging said carrier in a retraction direction, said length of belt and winding device in combination providing means for reversing the direction of movement of said carrier, thereby securing said carrier and length of belt against further movement in either said extraction direction or said retraction direction.

8. Safety belt adjusting apparatus according to claim 7, including an elongated release bar disposed adjacent said guide member and movable into engagement with said locking means for moving said locking means to said released position, permitting movement of said belt length and carrier in said retraction direction by means of said winding device.

9. Safety belt adjusting apparatus according to claim 8, including a stationary release arm disposed adjacent said guide member, engageable with said locking means for moving said locking means to said released position upon movement of said carrier to a predetermined retracted position along said guide member, said release arm holding said locking means in said released position during reversal in the direction of movement of said carrier associated with initiation of further movement of said belt and carrier in said extraction direction away from said retracted position.

References Cited

UNITED STATES PATENTS

| 2,886,259 | 5/1959 | Barecki | 242—107.4 |
| 3,174,704 | 3/1965 | Replogle | 74—527 X |
| 3,371,960 | 3/1968 | Bayer et al. | |
| 3,400,977 | 9/1968 | Jones | 297—389 X |
| 3,439,932 | 4/1969 | Lewis et al. | 297—389 X |
| 3,433,933 | 4/1969 | Jantzen | 297—389 X |
| 3,459,440 | 8/1969 | Hopka et al. | 297—388 |

FOREIGN PATENTS

| 1,054,245 | 1/1967 | Great Britain. |
| 1,097,178 | 12/1967 | Great Britain. |

JAMES T. McCALL, Primary Examiner.

U.S. Cl. X.R.

242—107.4; 297—389